United States Patent [19]

Goeke

[11] 4,111,589
[45] Sep. 5, 1978

[54] MULTIPLE CUTTING PLATE FOR PEELING MACHINES

[75] Inventor: Alfons Goeke, Solingen, Germany

[73] Assignee: Th. Kieserling & Albrecht, Solingen, Germany

[21] Appl. No.: 694,545

[22] Filed: Jun. 10, 1976

Related U.S. Application Data

[63] Continuation of Ser. No. 561,538, Mar. 24, 1975, abandoned.

[30] Foreign Application Priority Data

Mar. 28, 1974 [ES] Spain .................................. 424.739

[51] Int. Cl.² ............................................. B26D 1/00
[52] U.S. Cl. ...................................... 407/114; 407/118

[58] Field of Search .................. 29/95 R, 95 A, 95 B, 29/95 C, 95 D, 96, 105 A

[56] References Cited

U.S. PATENT DOCUMENTS

| 2,641,048 | 6/1953 | Vreeland | 29/95 R |
| 3,694,876 | 10/1972 | Erkfritz | 29/95 R |
| 3,762,005 | 10/1973 | Erkfritz | 29/105 A |
| 3,815,194 | 6/1974 | Gofke | 29/96 |

Primary Examiner—Harrison L. Hinson
Attorney, Agent, or Firm—Edward E. Sachs

[57] ABSTRACT

A multiple cutting plate for metal peeling machines in which a steel block of octagonal prismatic cross section is adapted to receive two spacedly arranged cutting blades, by means of brazing, with each blade forming a main and a secondary cutting edge and a chip deflecting step being provided on at least one main cutting edge.

8 Claims, 1 Drawing Figure

U.S. Patent  Sept. 5, 1978  4,111,589
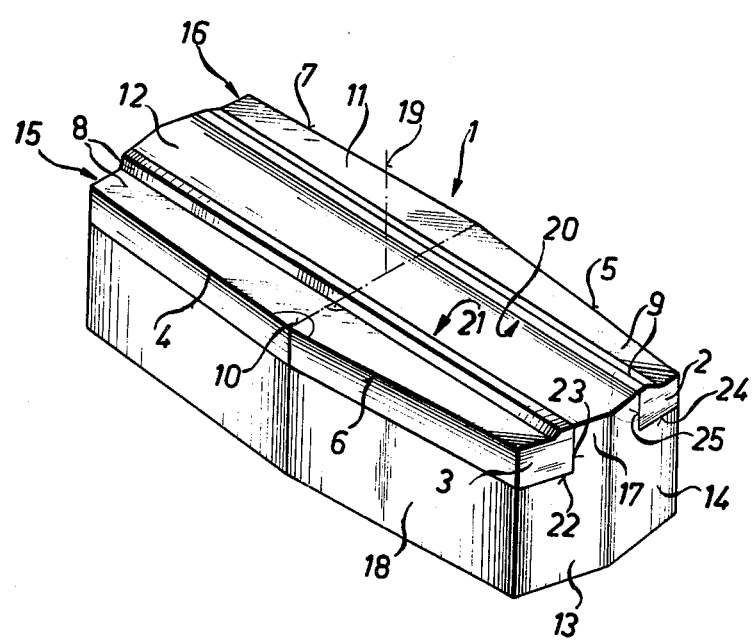

MULTIPLE CUTTING PLATE FOR PEELING MACHINES

This application is a continuation of U.S. Application, Ser. No. 561,538, filed Mar. 24, 1975, now abandoned, with a priority date of Mar. 28, 1974 derived from Spanish Application No. 424,739.

The invention relates generally to a multiple cutting plate adapted to be employed in metal peeling machines. Such machines peel the surfaces of bar stock and the like. The plate has an octagonal, prismatic cross section and cutting blades (or cutting tools) of suitable metal or ceramic material.

Cutting devices for use with machines for peeling elongated metal stock, or sections of elongated material, are subjected to particularly high stresses. For this reason, it is presently conventional to fabricate, almost universally, the plate or block of hard-metal. Hard-metal denotes a material which is particularly resistant to indentation, scratching, abrasion or cutting, e.g., tungsten.

In order to extend the work life of a blade for as long as possible, it is customary to fit replaceable blades into suitable tool holders. For instance, German Patent 1,800,195 discloses a multiple cutting plate of this kind. Herein, the plate is adapted to be rotated or turned about two axes and is provided with four cutting edges. In the octagonal cross section, the four cutting edges are significantly longer than the other four edges. The plate is secured to the surface formed with the relatively shorter edges. However, the approach exemplified by this prior art construction has numerous disadvantages.

The device is formed entirely of hard-metal or similar material and therefore is rather inelastic and frequently subject to breakage, and has four cutting edges, two of which are located on the bottom and form a part of the bearing surface, and consequently have a deleterious effect on the supportability in the tool holder. The two peel blades are located above each other and the cutting edge itself may not contact the bearing surface of the tool holder. Thus, a gap is created under the cutting edge in use, i.e., between the tool holder or support and the blade. Also, a highly unfavorable pressure distribution results in the region of contact area of the plate, on the tool holder.

Furthermore, in practice, it has been found that the breakage of a relatively dull cutting edge may also cause damage to another cutting edge located on the same surface.

Another disadvantage of devices exemplified by the prior art resides in that the multiple cutting plate is formed entirely of the same material as the blades, whereby increased material costs are incurred.

It is therefore the primary object of the present invention to provide a cutting device for metal peeling machines of the type which peel elongated bar or tube stock, and in which the device is effective to overcome the foregoing disadvantages and to provide a cutting plate less prone to breakage and satisfactorily supportable in the tool holder.

A further object of the present invention resides in providing a cutting tool with two cutting edges in a single blade.

A further object of the present invention resides in providing a cutting device in which the cutting tools or blades are physically separated by material which is elastic in comparison to hard-metal plates so that when one cutting edge breaks, the breakage effect will not be transmitted as harshly through the tool block so as to reduce the frequency of breakage of other blades or cutting edges.

A still further object resides in providing a cutting device of the type described above in which the blades or cutting tools are securely mounted in the plate or block in an improved manner to further the chip removal.

An aspect of the present invention resides in providing a multiple cutting plate for metal peeling machines which includes a metal block formed of relatively soft steel which has an octagonal cross section which includes a bottom surface, a top surface and vertically extending and transversely spaced sidewalls. The top surface provides in conjunction with the sidewalls two generally parallel extending transversely spaced recesses. Two cutting blades are secured to the block, with one cutting blade being secured in one recess and the other blade being secured in the second recess. Each blade forms a main and a secondary edge which extends linearly contiguous. These edges of each blade define with respect to each other an obtuse angle, with the cutting edges of each blade having an approximately equal axial length. Each blade is formed of cutting steel comparatively hard in comparison to the soft steel of the metal block.

A further aspect of the present invention resides in providing a multiple cutting plate for metal peeling machines which includes a metal block which has an octagonal prismatic cross section. Two cutting blades are secured to the block with each blade forming a main and a secondary cutting edge. A chip deflecting step is formed on at least the main cutting edge. Each blade has two contiguous sides with the sides of one blade being spaced relative to the sides of the other blade and a segment of the metal block being interposed between the aforesaid sides of the two blades.

A still further aspect of the present invention resides in providing a device as described in the preceding paragraph and wherein each blade is disposed by brazing into a recess of the block.

More specifically, these above recited objects are achieved, by the present invention, by means of blades each having two contiguous cutting edges and each blade being inserted and brazed into a steel member serving as the support for the cutting edges. The blades are separated from each other by the steel member which is interposed therebetween. This construction substantially reduces the likelihood of breakage of the multiple cutting plate.

For a better understanding of the present invention, together with other and further objects thereof, reference is had to the following description taken in connection with the accompanying drawing, and its scope will be pointed out in the appended claims.

Referring now to the single drawing, there is shown a multiple cutting plate or cutting device 1 having a steel block 18 of octagonal prismatic cross section, forming longitudinally extending recesses for receiving two spacedly arranged cutting blades 2 and 3 which are secured into the oppositely located recesses by brazing the contiguous sides 22, 23 and 24, 25 onto the block 18. Each blade is provided with a main cutting edge 4, 5 and a secondary cutting edge 6, 7. As will be evident from the drawing, the cutting edges 5 and 7 of blade 2 are contiguous, as are cutting edges 4 and 6 of blade 3. Each pair of cutting edges, e.g., 5 and 7, establish an obtuse angle with respect to each other. Each set of transversely spaced main and secondary cutting edges, i.e., 4, 7 and 5, 6 are arranged relative to each other, e.g., edge 4 vis-a-vis edge 7, at an angular relation which converges toward the longitudinal center of the block 18 thereby forming with the complementary and contiguous edges (see 5 and 6 for the example described) the aforementioned obtuse angle. The apex of the angle which bisects the block is shown at 10.

Thus, the block 18 carries on its upper surface two blades 2, 3 which are bisected thereby establishing, in each (approximately) half of the block a co-extending main and a secondary cutting edge which are non-contiguous, see, e.g., 4 and 7, and arranged in spaced relation.

Each blade 2, 3 is formed with a chip deflecting step 8, 9 on its main and its secondary cutting edges.

The chip deflector step 8, 9 extends at right angles to bisector 10 and each of the two steps are arranged parallel to each other but angularly relative to the cutting edges.

Each blade 2, 3 has a chip surface 11 provided with two slight inclines towards the top surface 12 of the block 18 of the multiple cutting plate, as can be seen from the profile of the blades at end faces 13, 14 (and 15, 16) shown in the drawing. The first incline determines the chip angle, while the second incline defines the drop in the chip deflecting step from end face 16 to end face 14. Since all the inclines are towards the common surface 12, the inclines of each blade are thus converging in a direction relative to each other (i.e., the inclines of the other blade), and thus towards an imaginary apex.

Between the blades 2 and 3 the block 18 forms a web 17, the top surface of which is flush with adjacent surfaces of blades 2, 3, so that the movement of the chips is not opposed by protruding edges and the possibility of the chips tearing out a blade is reduced or eliminated.

The axially elongated rear or abutting surfaces 20, 21 of blades 2, 3 face and are arranged parallel to each other and each backs against complementary, spaced surfaces of body 18, thereby minimizing the overall dimension of the device 1.

As a modification, the blades 2, 3 can be secured to the plate 1 by extending bolts from the bottom surface thereof. This approach is also feasible when the web 17 is fairly narrow since the bottom surface of the block 18 normally provides ample space for cutting a threaded opening thereinto (not shown).

For purposes of description it may be assumed that blade 3 is shown in the drawing in an operating position. The blade 2 is utilized by turning the block 18, e.g., 180°, about the vertical axis 19.

While there have been described what are at present considered to be the preferred embodiments of this invention, it will be obvious to those skilled in the art that various changes and modifications may be made therein without departing from the invention, and it is aimed, therefore, in the appended claims, to cover all such changes and modifications as fall within the true spirit and scope of the invention.

What is claimed is:

1. A multiple cutting plate for metal peeling machines, comprising:
    a metal block formed of relatively soft steel having an octagonal cross section, providing a bottom surface, vertically extending and transversely spaced sidewalls, and a top surface providing in conjunction with said sidewalls two generally parallel extending transversely spaced recesses;
    two cutting blades secured to said block formed of comparatively hard material, with one cutting blade secured in one recess and the other blade in the second recess with said block forming a continuous support between the blades, each blade providing a main and secondary cutting edge which extend linearly contiguous, said edges of each blade define with respect to each other an obtuse angle, with the cutting edges of each blade having an approximately equal axial length.

2. A multiple cutting plate according to claim 1, wherein the cross-sectional area of each cutting blade increases toward the axial center of the blade.

3. A multiple cutting plate according to claim 1, wherein the main cutting edge of one blade is located transversely spaced from the secondary cutting edge of the other blade.

4. A multiple cutting plate according to claim 1, wherein each blade includes a longitudinally extending chip deflecting step arranged parallel with respect to each other but angularly with respect to the cutting edge of each blade.

5. A multiple cutting plate according to claim 3, wherein said block carries said last mentioned main and secondary cutting edge facing generally the upper surface of said block and longitudinally extending toward the axial end of the block, and the second main and secondary cutting edge being located at the opposite end of said block.

6. A multiple cutting plate according to claim 1, wherein each blade is formed with a longitudinally extending double incline.

7. A multiple cutting plate according to claim 6, wherein the inclines of each blade are converging in a direction relative to each other towards an imaginary apex.

8. A multiple cutting blade according to claim 1, wherein one axial end of said block extends between said blades and the upper surface of said block at said end is generally flush with the contiguous surfaces of the adjacent blades.

* * * * *